(12) United States Patent
Yashiro

(10) Patent No.: US 7,224,892 B2
(45) Date of Patent: May 29, 2007

(54) MOVING IMAGE RECORDING APPARATUS AND METHOD, MOVING IMAGE REPRODUCING APPARATUS, MOVING IMAGE RECORDING AND REPRODUCING METHOD, AND PROGRAMS AND STORAGE MEDIA

(75) Inventor: Satoshi Yashiro, Kanagawa (JP)

(73) Assignee: Canon Kabushiki Kaisha (JP)

( * ) Notice: Subject to any disclaimer, the term of this patent is extended or adjusted under 35 U.S.C. 154(b) by 1064 days.

(21) Appl. No.: 10/184,101

(22) Filed: Jun. 26, 2002

(65) Prior Publication Data

US 2003/0020966 A1    Jan. 30, 2003

(30) Foreign Application Priority Data

Jun. 26, 2001  (JP) ............................ 2001-193450
Jun. 26, 2001  (JP) ............................ 2001-193451

(51) Int. Cl.
*H04N 5/91*    (2006.01)

(52) U.S. Cl. ..................... 386/124; 386/33; 386/116; 386/83

(58) Field of Classification Search ................. 386/52, 386/64, 95, 124
See application file for complete search history.

(56) References Cited

U.S. PATENT DOCUMENTS 6,084,169 A *   7/2000   Hasegawa et al. ............ 84/600
2004/0012623 A1*  1/2004   Yashiro et al. .............. 345/723

FOREIGN PATENT DOCUMENTS

JP    10-13773 A    1/1998
JP    10-243323 A   9/1998

* cited by examiner

*Primary Examiner*—Thai Q. Tran
*Assistant Examiner*—Helen Shibru
(74) *Attorney, Agent, or Firm*—Rossi, Kimms & McDowell LLP

(57) ABSTRACT

A moving image recording apparatus is provided, which allows a user to enjoy reproducing a moving image by easily finding a corresponding desired scene from moving images. A moving image is recorded together with attribute information therefor. Division points at which the moving image breaks on a time base are detected, and the moving image is divided at the detected division points into scenes. The scenes into which the moving image is divided at the detected division points are joined to limit the number of scenes to not more than a predetermined value if the number of the scenes into which the moving image is divided exceeds the predetermined value. Still images are created from respective ones of the scenes the number of which has been limited, and the created still images are recorded as the attribute information.

8 Claims, 13 Drawing Sheets

| PICNIC | 2000/11/05 |
| --- | --- |
| OLDEST SON'S ATHLETIC MEET | 2000/10/13 |
| TARO'S WEDDING CEREMONY | 2000/09/30 |
| AT XX AMUSEMENT PARK | 2000/05/05 |
| BANK OF TAMA RIVER | 2000/04/07 |
| SNOW BOARD MEET | 2000/02/15 |

901     902

MOVING IMAGE RECORDING APPARATUS AND METHOD, MOVING IMAGE REPRODUCING APPARATUS, MOVING IMAGE RECORDING AND REPRODUCING METHOD, AND PROGRAMS AND STORAGE MEDIA

BACKGROUND OF THE INVENTION

1. Field of the Invention

This invention relates to a moving image recording apparatus and method, a moving image reproducing apparatus, a moving image recording and reproducing method, programs for implementing these methods, and storage media storing these programs.

2. Description of the Related Art

In recent years, the diffusion of VTRs and video movies has led to the use of animated images as familiar media. Further, the advance of computer technologies has made it possible to store animated images in a randomly accessible storage medium such as a hard disk for accumulation and management. Consequently, users can enjoy reproducing arbitrary animated images from arbitrary portions thereof without any cumbersome operations such as replacement and rewinding of video tapes.

To manage a plurality of animated images, the users have imparted titles or keywords to these animated images. Alternatively, as described in Japanese Laid-Open Patent Publications (Kokai) Nos. 10-243323 and 10-13773, the users have stored reduced-sized representative images of scenes as attribute information in association with the respective animated images and found a target animated image scene using the attribute information.

Further, the users have printed one favorable scene of a moving image using a video printer and labeled such scenes or enjoyed viewing them.

However, if the representative images of the scenes are displayed in a list as the attribute information using the conventional scene managing technique, which is intended mainly to edit the moving images, a huge number of representative images are generated if the moving image is divided into small scenes. Then, with a display apparatus such as a domestic TV or a display device of a portable terminal which has a lower resolution than the display of a personal computer, much time is required to select representative images. As a result, little time is left for reproduction and appreciation of the moving images, which is the original purpose of the scene management.

Further, according to the conventional scene management technique, there are few keys to selection of representative images. As a result, if some representative images of scenes are similar, a desired scene of a moving image cannot be accurately and quickly selected. Furthermore, if the user prints a list of the representative images to enjoy viewing it like an album, the printed similar images are not good to look at, and hence the printing can result in waste of ink or sheets.

SUMMARY OF THE INVENTION

It is a first object of the present invention to provide a moving image recording apparatus and method, a moving image reproducing apparatus, and a moving image recording and reproducing method which allow a user to enjoy reproducing a moving image by easily finding a corresponding desired scene from moving images, as well as programs for implementing these methods and storage media storing these programs.

It is a second object of the present invention to provide a moving image recording apparatus and method, a moving image reproducing apparatus, and a moving image recording and reproducing method which allow a user to print animated image data so as to enjoy viewing the data like an album without wasting ink or sheets, as well as programs for implementing these methods and storage media storing these programs.

To attain the first object, in a first aspect of the present invention, there is provided a moving image recording apparatus comprising recording means for recording a moving image together with attribute information therefor, division point detecting means for detecting division points at which the moving image breaks on a time base and dividing the moving image at the detected division points into scenes, scene joining means for joining the scenes into which the moving image is divided at the detected division points to limit a number of scenes to not more than a predetermined value if a number of the scenes into which the moving image is divided exceeds the predetermined value, and still image creating means for creating still images from respective ones of the scenes the number of which has been limited, and wherein the created still images are recorded as the attribute information by the recording means.

Preferably, if the length of any of the scenes into which the moving image is divided is smaller than a predetermined value, the scene joining means joins the scene to at least one other scene.

Preferably, the recording means records, as the attribute information, lengths of the scenes into which the moving image is divided at the division points and the created still images in association with time information on the moving image.

The division point detecting means detects the division points based on amounts of changes between frame images constituting the moving image, discontinuities between time codes, or the attribute information.

More preferably, the scene joining means joins the scene to the at least one other scene so as to minimize differences between lengths of the scenes.

Further preferably, even if the number of the scenes into which the moving image is divided at the detected division points is equal to or less than the predetermined value, if the length of any of the scenes is smaller than the predetermined value, the scene joining means joins the scene to the at least one other scene.

Also preferably, the still image creating means creates each of the still images from a leading frame image of a corresponding one of the scenes.

The moving image recording apparatus according to the first aspect is applied to a moving image recording and reproducing apparatus comprising display means for displaying the created still images, still image selecting means for selecting any of the displayed still images, and reproducing means for reproducing scenes of the moving image corresponding to the selected still images.

To attain the first object, in a second aspect of the present invention, there is provided a moving image recording method comprising the steps of recording a moving image together with attribute information therefor, detecting division points at which the moving image breaks on a time base and dividing the moving image at the detected division points into scenes, joining the scenes into which the moving image is divided at the detected division points to limit a number of scenes to not more than a predetermined value if a number of the scenes into which the moving image is divided exceeds the predetermined value, creating still images from respective ones of the scenes the number of which has been limited, and recording the created still images as the attribute information.

To attain the first object, in a third aspect of the present invention, there is provided a moving image recording and reproducing method comprising the steps of recording a moving image together with attribute information therefor, detecting division points at which the moving image breaks on a time base and dividing the moving image at the detected division points into scenes, joining the scenes into which the moving image is divided at the detected division points to limit a number of scenes to not more than a predetermined value if a number of the scenes into which the moving image is divided exceeds the predetermined value, creating still images from respective ones of the scenes the number of which has been limited, recording the created still images as the attribute information, displaying the created still images, selecting any of the displayed still images, and reproducing scenes of the moving image corresponding to the selected still images.

To attain the first object, in a fourth aspect of the present invention, there is provided a moving image reproducing apparatus that is applicable to the moving image recording apparatus according to the first aspect and that reproduces an animated image recorded in a storage medium, comprising display means for displaying still images recorded in the storage medium, still image selecting means for selecting any of the displayed still images, and reproducing means for reproducing scenes of the moving image corresponding to the selected still images.

To attain the first object, in a fifth aspect of the present invention, there is provided a computer-readable storage medium storing a program code for realizing the moving image recording method according to the second aspect or the moving image recording and reproducing method according to the third aspect.

To attain the first object, in a sixth aspect of the present invention, there is provided a program comprising a program code for realizing the moving image recording method according to the second aspect or the moving image recording and reproducing method according to the third aspect.

According to the first to sixth aspects of the present invention, it is possible to easily find desired scenes from a moving image to enjoy reproducing the desired scenes.

To attain the first and second objects, in a seventh aspect of the present invention, there is provided a moving image recording apparatus comprising recording means for recording a moving image together with attribute information therefor, division point detecting means for detecting division points at which the moving image breaks on a time base and dividing the moving image at the detected division points into scenes, still image creating means for creating still images from respective ones of the scenes into which the moving image is divided at the detected division points, similarity degree calculating means for calculating degrees of similarity between the created still images, scene joining means for joining the scenes into which the moving image is divided, based on the calculated degrees of similarity, and deleting means for deleting the created still images from the joined scenes.

Preferably, the moving image recording apparatus according to the seventh aspect further comprises deleting object selecting means for grouping the created still images based on the calculated degrees of similarity and selecting from the grouped created still images still images which are designated as objects to be deleted by a user, and wherein the scene joining means joins each of scenes corresponding to the still images selected as objects to be deleted, to at least one other scene.

To attain the first and second objects, in an eighth aspect of the present invention, there is provided a moving image recording method comprising the steps of recording a moving image together with attribute information therefor, detecting division points at which the moving image breaks on a time base and dividing the moving image at the detected division points into scenes, creating still images from respective ones of the scenes into which the moving image is divided at the detected division points, calculating degrees of similarity between the created still images, joining the scenes into which the moving image is divided, based on the calculated degrees of similarity, and deleting the created still images from the joined scenes.

To attain the first and second objects, in a ninth aspect of the present invention, there is provided a moving image recording and reproducing method comprising the steps of recording a moving image together with attribute information therefor, detecting division points at which the moving image breaks on a time base and dividing the moving image at the detected division points into scenes, creating still images from respective ones of the scenes into which the moving image is divided at the detected division points, calculating degrees of similarity between the created still images, joining the scenes into which the moving image is divided, based on the calculated degrees of similarity, deleting the created still images from the joined scenes, displaying the created still images, selecting any of the displayed still images, and reproducing means for reproducing scenes of the moving image corresponding to the selected still images.

To attain the first and second objects, in a tenth aspect of the present invention, there is provided a moving image reproducing apparatus which is applicable to a moving image recording apparatus according to the seventh aspect and which reproduces an animated image stored in a storage medium, comprising display means for displaying still images recorded in the storage medium, still image selecting means for selecting any of the displayed still images, and reproducing means for reproducing scenes of the moving image corresponding to the selected still images.

Preferably, the moving image reproducing apparatus according to the tenth aspect further comprises print means for printing the selected still images.

To attain the first and second objects, in an eleventh aspect of the present invention, there is provided a computer-readable storage medium storing a program code for realizing a moving image recording method according to the eighth aspect or a moving image recording and reproducing method according to the ninth aspect.

To attain the first and second objects, in a twelfth aspect of the present invention, there is provided a program comprising a program code for realizing a moving image recording method according to the eighth aspect or a moving image recording and reproducing method according to the ninth aspect.

The above and other objects, features, and advantages of the invention will become more apparent from the following detailed description taken in conjunction with the accompanying drawings.

BRIEF DESCRIPTION OF THE DRAWINGS

FIG. 8 is a view showing an example of an index displayed on the display device 107;

DETAILED DESCRIPTION OF THE PREFERRED EMBODIMENTS

The present invention will now be described in detail with reference to the drawings showing preferred embodiments of thereof.

Figure 1:
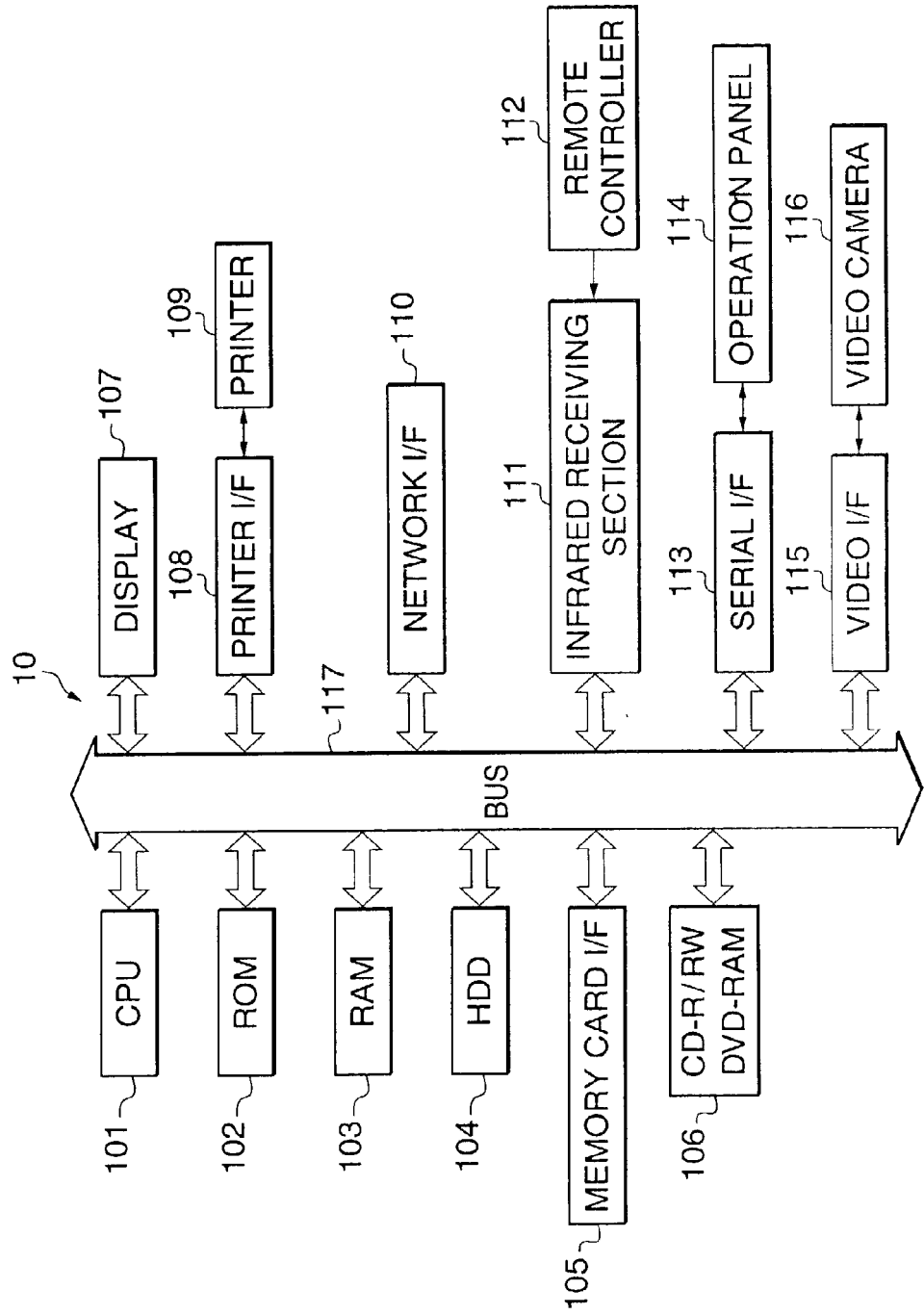
FIG. 1 is a block diagram showing the construction of a moving image recording and reproducing apparatus 10 to which are applied a moving image recording apparatus and a moving image reproducing apparatus according to a first embodiment of the present invention.

FIG. 1 is a block diagram showing the construction of a moving image recording and reproducing apparatus 10 to which are applied a moving image recording apparatus and a moving image reproducing apparatus according to a first embodiment of the present invention. In the figure, reference numerals 101 to 107 designate a CPU, a ROM, a RAM, a hard disk drive, a PC card read and write interface (memory card I/F), a DVD-RAM/R/RW and CD-R/RW drive (CD/DVD drive), and a display device, respectively. Reference numerals 108 to 114 designate a printer interface, a printer, a network interface, an infrared receiving section, an infrared remote controller, a serial interface, and an operation panel, respectively.

Further, reference numeral 115 designates a video I/F connected to peripheral devices such as a video camera through a composite video terminal or S-VHS video terminal, and an audio line I/O terminal or audio digital I/O terminal, or an IEEE 1394 terminal. The video I/O encodes analog signals to convert them into digital data that can be processed by the CPU 101. Reference numeral 116 designates a video camera. Reference numeral 117 designates a bus via which digital data is input or output.

Figure 2:
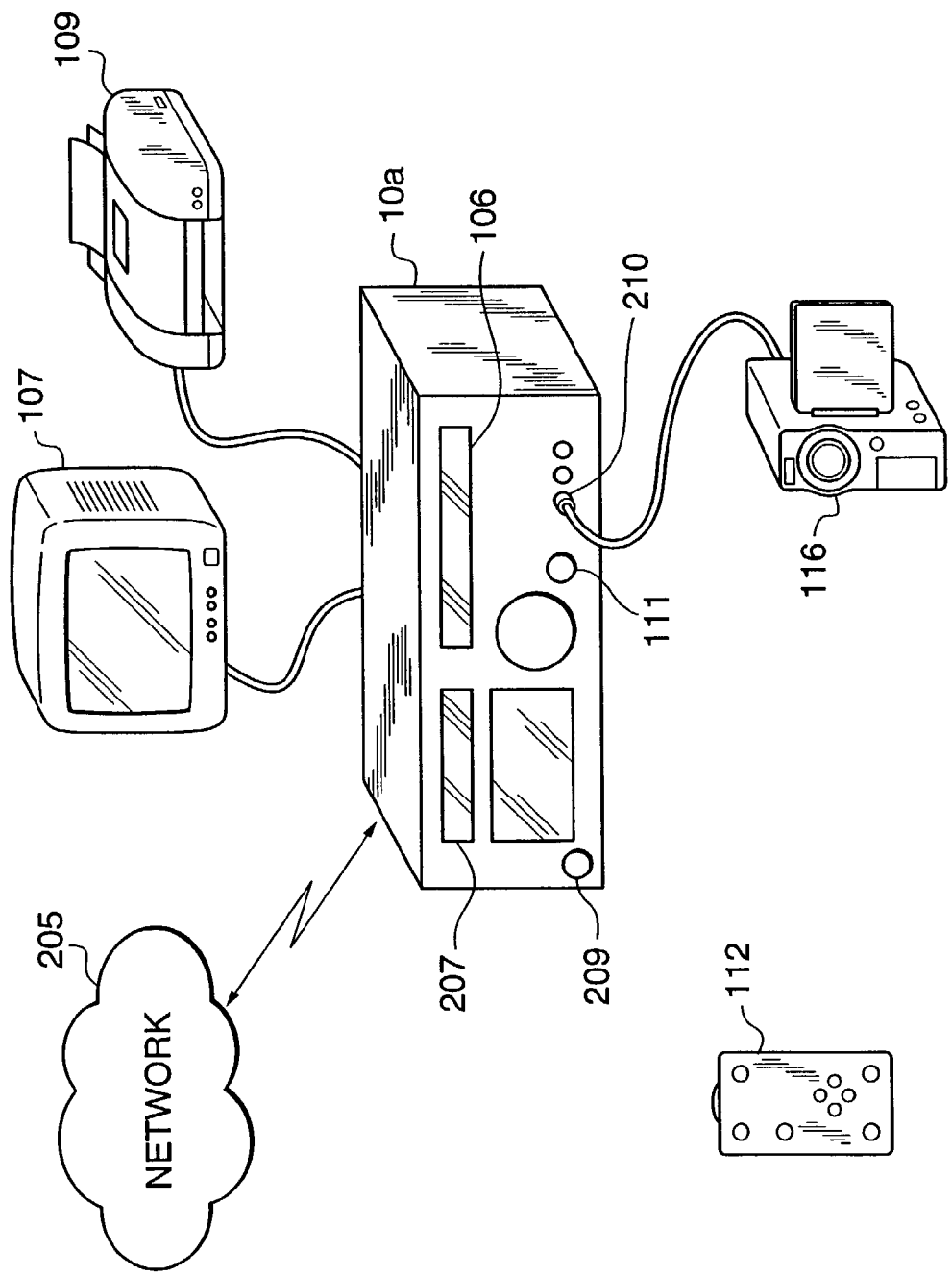
FIG. 2 is a view showing the connection between the moving image recording and reproducing apparatus and peripheral devices.

FIG. 2 is a view showing the connection between the moving image recording and reproducing apparatus and peripheral devices. Various peripheral devices are connected to a moving image recording and reproducing apparatus main body 10a. A display device 107 represents a television receiver, a display of a portable terminal, a monitor of a video camera, a monitor of a personal computer, or the like. The television receiver provides a conventional broadcasting screen having an aspect ratio of 4:3 and/or a so-called wide screen having an aspect ratio of 16:9. On the other hand, a TFT liquid crystal display for a personal computer provides a screen having an aspect ratio of 16:10.

Further, a printer 109 is connected to the moving image recording and reproducing apparatus main body 10a via the printer interface 108 to print still images. The main body 10a is connected to a network 205 such as the Internet through a network I/F 110. The CD/DVD drive 106 writes and reads data to and from a medium such as a DVD-RAM/ROM/R/RW or a CD-R/RW. A PC card slot 207 is connected to the main body 10a via the memory card I/F 105. The main body 10a has a front surface thereof provided with a power switch 209, a video terminal 210, and others. In the present embodiment, the video camera 116 is used as a device for loading and reproducing animated images. However, a video deck or a television tuner may be used in place of the video camera.

Figure 3:
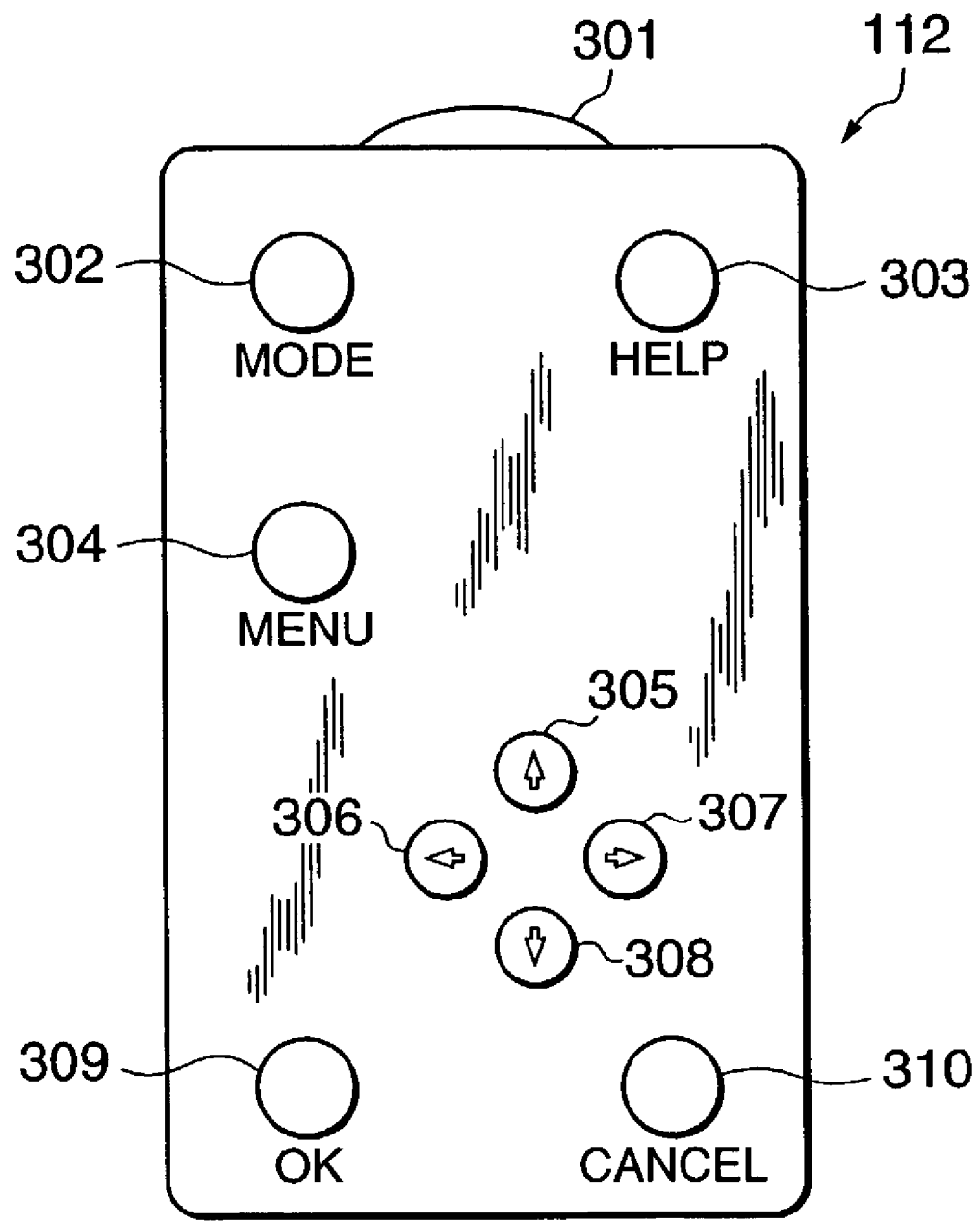
FIG. 3 is a view showing an operation surface of an infrared remote controller 112.

FIG. 3 is a view showing an operation surface of the infrared remote controller 112. In the figure, reference numeral 301 denotes an infrared emitting section. Various buttons are provided on the operation surface. Reference numerals 302 to 305 designate a mode setting button, a help button, and a menu button, respectively. Reference numerals 305 to 308 designate an up arrow button, a left arrow button, a right arrow button, and a down arrow button, respectively. Reference numerals 309 and 310 designate an OK button and a cancel button, respectively.

Figure 4:
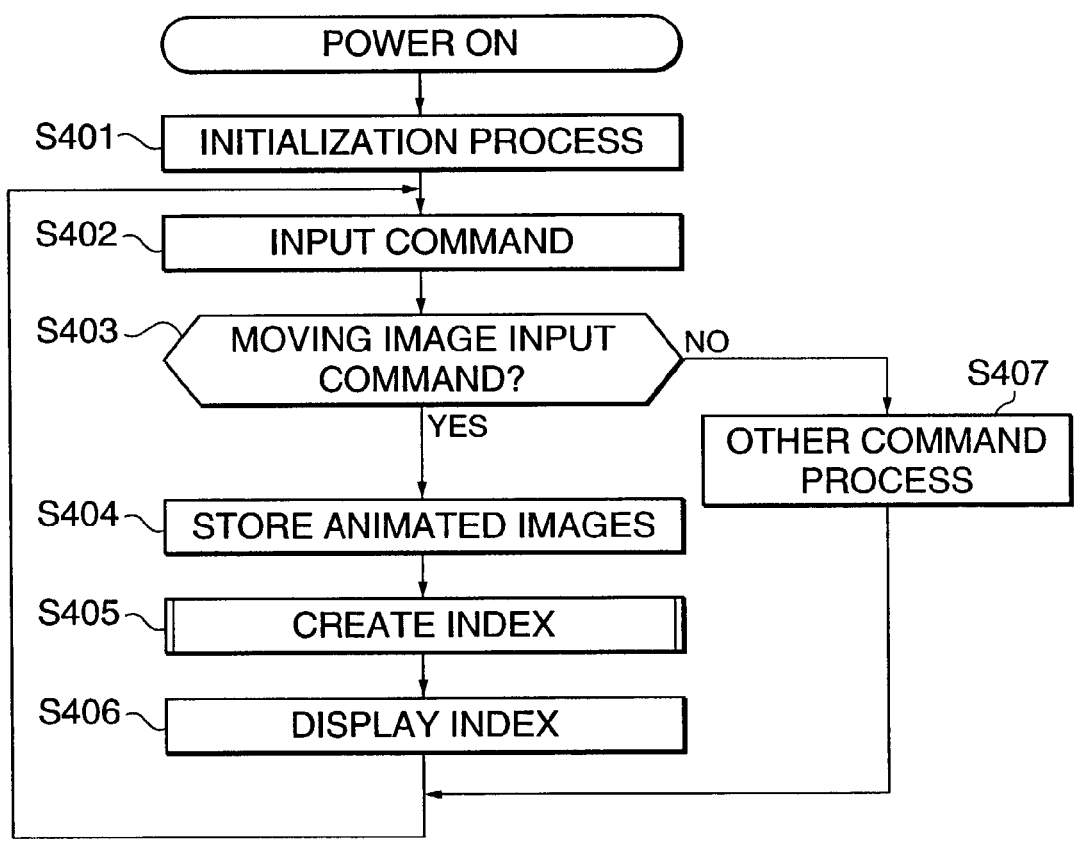
FIG. 4 is a flow chart showing a moving image recording and reproducing process executed by the dynamic recording and reproducing apparatus.

Now, a description will be given of the operation of the moving image recording and reproducing apparatus constructed as described above. FIG. 4 is a flow chart showing a moving image recording and reproducing process executed by the dynamic recording and reproducing apparatus. A program for implementing this process is stored in the ROM 102 and executed by the CPU 101.

First, when the power button 209 is depressed to turn on a power supply, initialization of the system, including initialization of various interfaces, is carried out (step S401). The process waits for a command to be input from the remote controller 112 or operation panel 114 (step S402). A command is also generated when it is detected that the video camera 116 connected to the video I/F 115 has started reproduction.

When a command is input, the contents thereof are checked to determine whether or not it is a moving image input command (step S403). If it is not a moving image input command, a process for another command is executed (step S407). The process then proceeds to the step S402.

On the other hand, if a moving image input command is identified in the step S403, encoded animated image data input via the video I/F 115 is stored in the hard disk drive 104 (step S404). Then, an index is created (step S405). Here, the index is comprised of still images obtained from scenes obtained by dividing a moving image, attribute information such as the start point and length of each scene, and data in which the scenes are associated with respective animated image data in order to allow the moving image to be reproduced.

Once the index has been completed, the index is displayed (step S406), followed by the process being terminated.

Figure 6:
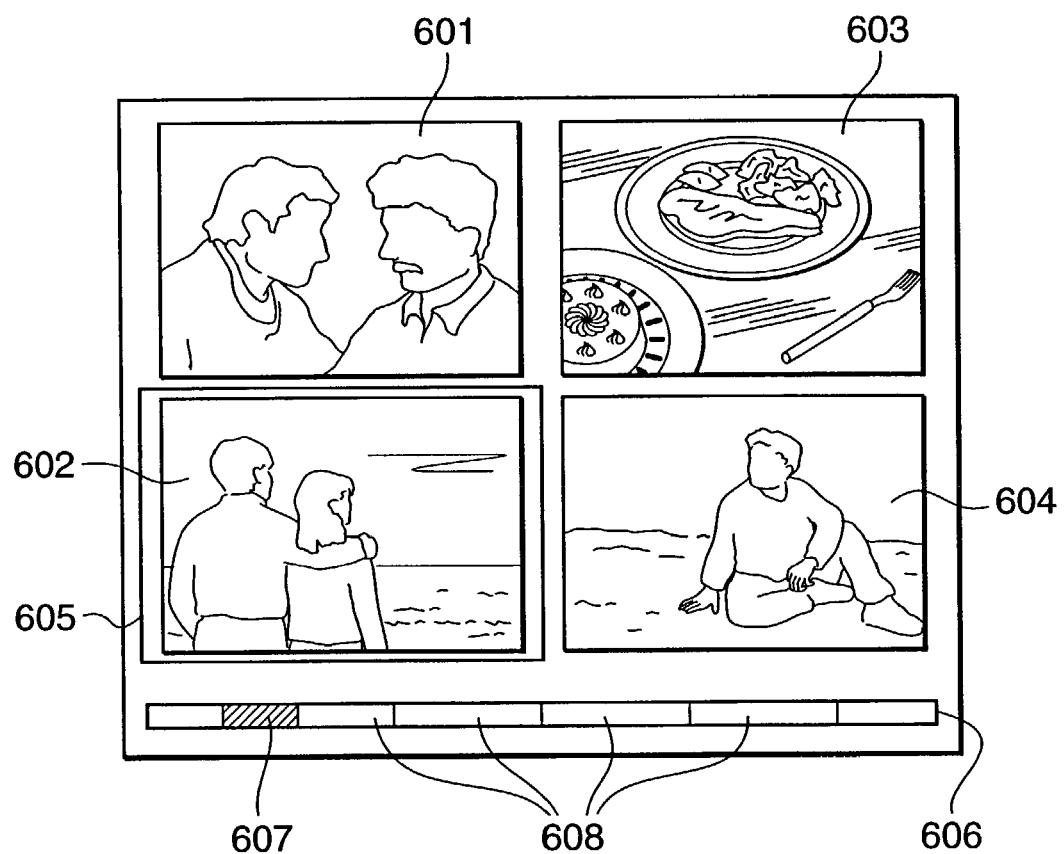
FIG. 6 is a view showing an example of an index displayed on a display device 107.

FIG. 6 is a view showing an example of the index displayed on the display device 107. In the figure, reference numerals 601 to 604 designate still images expressing scenes obtained from leading portions of cutout animated images. Reference numeral 605 denotes a cursor indicating a presently selected scene. Then, when one of the arrow buttons 305 to 308 of the remote controller 112 is depressed to select one of all the cutout scenes and the OK button 309 is depressed, reproduction of the corresponding animated image is started from the leading portion of the selected scene. Reference numeral 606 designates a moving image bar the whole of which represents the time required to reproduce one animated image. Reference numeral 607 designates a present marker that indicates the present scene such that the position and length of the presently selected scene can be recognized with respect to the entire animated image. Reference numeral 608 designates scene markers that indicate all the other scenes such that the leading portion and length of each scene can be recognized at a glance.

Figure 5:
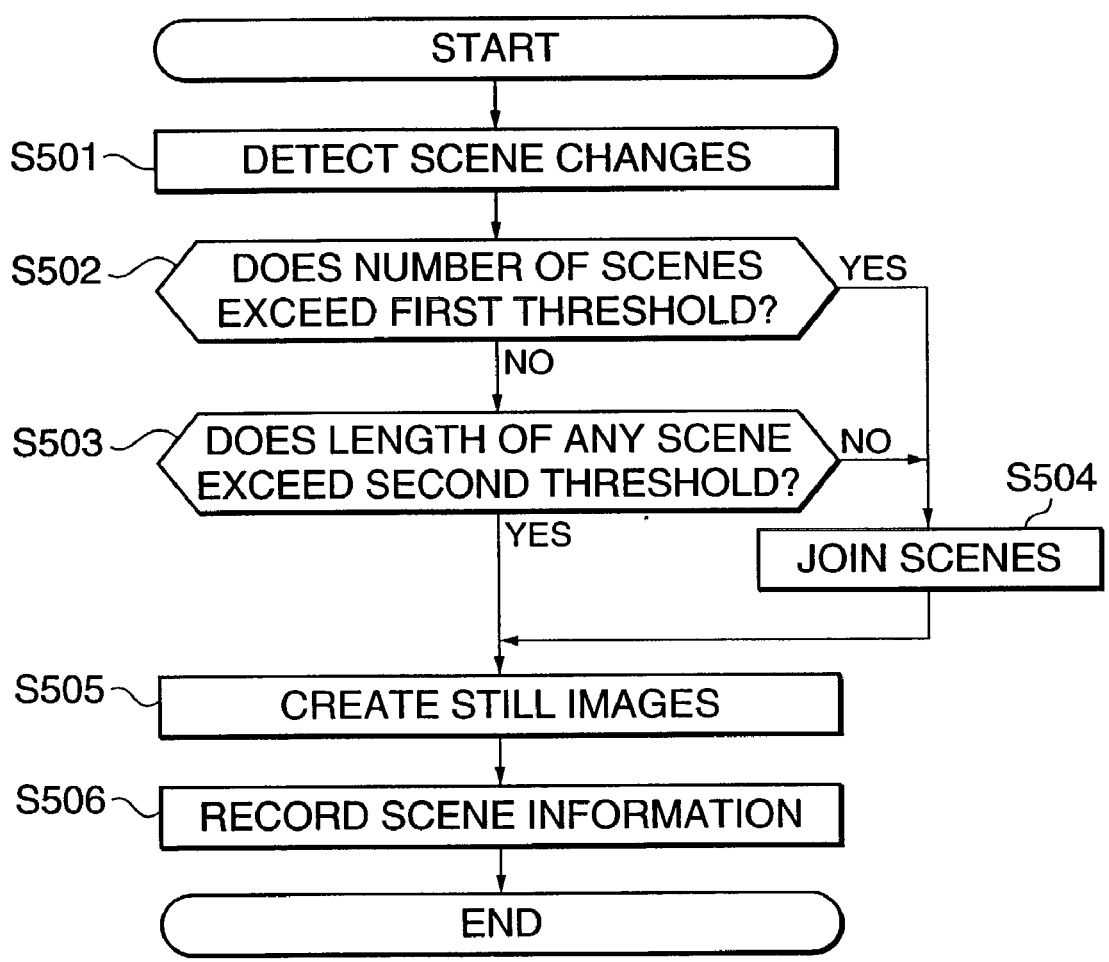
FIG. 5 is a flow chart showing an index creating process executed in a step S405.

FIG. 5 is a flow chart showing the index creating process executed in the step S405. First, breaks (division points) between scenes are detected (step S501). To detect breaks between scenes, various methods may be used. However, the present embodiment uses a method of detecting breaks based on changes between frame images.

According to the method of detecting breaks based on changes between frame images, images are each taken out by one frame from a moving image. Then, the interframe similarity (distance) between each taken-out frame and a group of past frames is calculated. Here, the group of past frames may include a single frame or a plurality of frames, and an algorithm therefor is not particularly limited.

The simplest example will be given. The present frame and the preceding frame are each divided by longitudinally and transversely cutting the frame image into a plurality of blocks in the form of a lattice. For each block, a mean value for each of RGB channels is calculated. Then, the sum of squares of a difference between the mean values for each of the RGB channels of the corresponding blocks of the preceding and present frames is determined. The determined sum of squares is regarded as the interframe similarity (distance) indicative of the degree of similarity between the scenes. The smaller the interframe similarity value, the higher the degree of similarity. That is, the greater the interframe similarity value, the lower the degree of similarity, i.e., there is likely to be a break between the scenes.

The interframe similarity (distance) is calculated using Equation (1) as follows:

$$\sum_{i=1}^{K} \{(P1_{iR} - P2_{iR})^2 + (P1_{iG} - P2_{iG})^2 + (P1_{iB} - P2_{iB})^2\} \quad (1)$$

The contents of variables in this equation are as follows:
i: Block being processed
K: Number of blocks obtained by division
$P1_{iR}$: mean value for the R channel of the i-th block of the preceding frame
$P1_{iG}$: mean value for the G channel of the i-th block of the preceding frame
$P1_{iB}$: mean value for the B channel of the i-th block of the preceding frame
$P2_{iR}$: mean value for the R channel of the i-th block of the present frame
$P2_{iG}$: mean value for the G channel of the i-th block of the present frame
$P2_{iB}$: mean value for the B channel of the i-th block of the present frame For example, if the above described method is used to determine whether or not there is a break between the scenes and it is determined that there is a break therebetween, then the frame in which the break is present is defined as a scene start frame. Then, the number of this frame is stored, together with the degree of similarity (or distance) indicative of the level of dissimilarity between these scenes, and information indicating whether or not the latter scene is a blank scene. This information will be referred to as "scene information" and is regarded as a part of the index.

Further, the length of each scene can be determined from the difference between the start frame number of the next scene and the start frame member of the present scene. The length of the last scene can be determined from the difference between the number of frames in the entire animated image and the start frame number of the final scene.

Once the breaks (division points) are thus detected, it is determined whether or not the number of scenes exceeds a preset first threshold (step S502). If the number of scenes is smaller than the first threshold, then it is determined whether or not the length of each scene exceeds a preset second threshold (step S503). In this case, if there is an excessively short scene, then even if the number of scenes is smaller than the predetermined value, this scene is joined to the adjacent scene to reduce the number of indices. In the step S503, if the length of each scene exceeds the second threshold, then the process proceeds directly to a step S505.

If the number of scenes exceeds the first threshold in the step S502 or the length of any scene is smaller than the second threshold, then a scene joining process is executed (step S504). In the scene joining process, the number of scenes is reduced by joining scenes to each other so that the length of each joined scene exceeds the second threshold and the standard deviation (variation) of the lengths of the scenes is minimized. This process is not executed in an exceptional case where there is only one scene or the length of the entire animated image is smaller than the second threshold.

Two methods will be shown as simple examples of the scene joining processes. With a first method, the length of each scene and the length of the preceding scene are added together to obtain the sum of the lengths. Then, one of the scenes which has the smallest sum is joined to the preceding scene. Subsequently, a similar process is repeated as long as the number of scenes exceeds the first threshold. Further, with a second method, the entire animated image is divided into equal scenes on a time base corresponding in number to the first threshold. Then, scenes each having a scene start point closest to the corresponding divided point are employed. The other scenes which have not been employed are each joined to a previous scene that has been employed. The second method is effective particularly if the number of animated images is sufficiently larger than the number of scenes corresponding to the first threshold.

After the scene joining process is executed in the step S504, still images are created (step S505). In the simplest example, a leading frame image of each scene is set as a still image for this scene. Alternatively, a plurality of frame images may be synthesized together to obtain a still image. Subsequently, the scene information and still images are associated with the moving images. Then, the obtained correspondences are recorded in the hard disk drive as indices (step S506). Then, the process is terminated.

Thus, in the first embodiment, a reduced number of still images representing the scenes are displayed on the display device 107. Therefore, the user can easily find the desired scene to enjoy reproducing the corresponding animated image.

Figure 7:
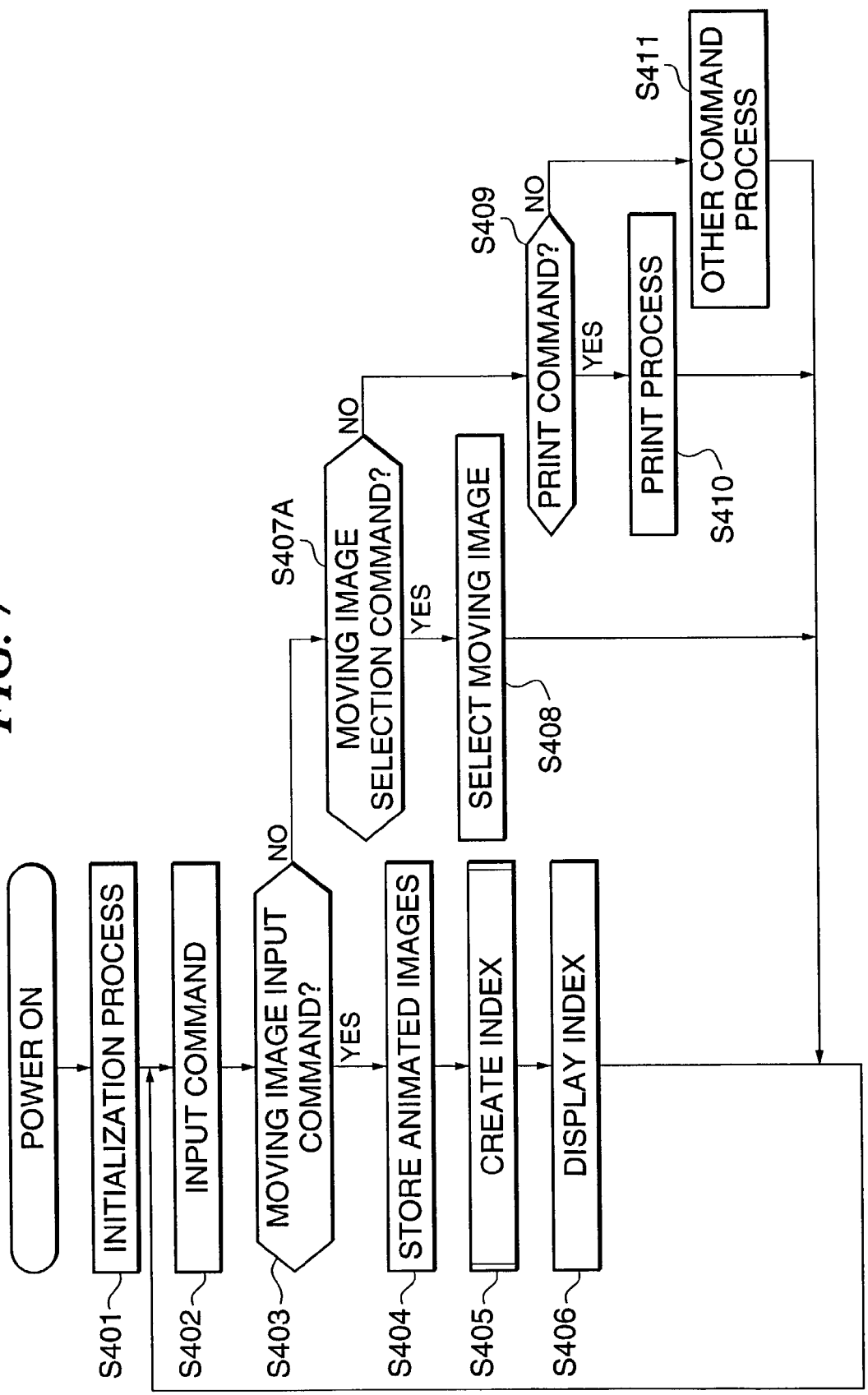
FIG. 7 is a flow chart showing a moving image recording and reproducing process executed by a moving image recording and reproducing apparatus to which are applied a moving image recording apparatus and a moving image reproducing apparatus according to a second embodiment of the present invention.

Now, a second embodiment of the present invention will be described. The construction of a moving image recording and reproducing apparatus of the second embodiment is identical with that of the first embodiment. Accordingly, elements and parts corresponding to those of the first embodiment are designated by the same reference numerals, and description thereof is omitted. Here, only process operations that are not included in the first embodiment will be described. FIG. 7 is a flow chart showing a moving image recording and reproducing process executed by the moving image recording and reproducing apparatus according to the second embodiment. A program for implementing this process is stored in the ROM 102 and executed by the CPU 101. Further, the same steps as those of the first embodiment will be indicated by the same step numbers.

First, when the power button 209 is depressed to turn on the power supply, initialization of the system, including initialization of various interfaces, is carried out (step S401). The process waits for a command input from the remote controller 112 or operation panel 114 (step S402). A command is also generated when it is detected that the video camera 116 has started reproduction via the video I/F 115.

When a command is input, the contents thereof are checked to determine whether or not it is a moving image input command (step S403). If it is a moving image input command, encoded animated image data input via the video I/F 115 is stored in the hard disk drive 104 (step S404). Then, an index is created (step S405). Here, the index is comprised of still images obtained from scenes obtained by dividing a moving image, attribute information such as the start point and length of each scene, and data in which the scenes are associated with respective animated image data in order to reproduce the moving image. The details of the process of creating an index will be described later.

Once the index has been completed, the index is displayed (step S406) and the process is terminated. An example of the index displayed on the display device 107 is as shown in FIG. 6 referred to with respect to the first embodiment. That is, reference numerals 601 to 604 designate still images expressing scenes obtained from leading portions of cutout animated images. Reference numeral 605 denotes a cursor indicating s presently selected scene. Then, when one of the arrow buttons 305 to 308 of the remote controller 112 is depressed to select one of all the cutout scenes and the OK button 309 is depressed, reproduction of the corresponding animated image is started from the leading portion of the selected scene. Reference numeral 606 designates a moving image bar the whole of which represents the time required to reproduce one animated image. Reference numeral 607 designates a present marker indicating the present scene such that the position and length of the presently selected scene can be recognized with respect to the entire animated image. Reference numeral 608 designates scene markers that indicate all the other scenes such that the leading portion and length of each scene can be recognized at a glance.

On the other hand, in the step S403, if the input command is for animated image input, then it is determined whether or not it is a moving image selection command (step S407A). If it is a moving image selection command, the display device is controlled to display a moving image selection screen for the user to select a moving image (step S408).

FIG. 8 is a view showing an example of the moving image selection screen displayed on the display device 107. In the figure, reference numeral 901 designates the title of a moving image. Reference numeral 902 designates the date on which photographing was started. Reference numeral 903 designates a cursor indicating a presently selected animated image. The titles 901 of the moving images are arranged in the form of a list in the order of the photographing start date 902 starting with the latest date.

The up or down arrow button 305 or 308 of the remote controller 112 is depressed to move the cursor upward or downward. Then, the OK button 309 is depressed to determine a moving image to be printed. Further, by scrolling or switching the screen, the cursor can be moved to any target animated images. Subsequently, the process returns to the step S402 to wait for a next command to be input.

On the other hand, in the step S407A, if the input command is for animated image selection, it is determined whether or not the input command is for printing (step S409). If it is a print command, the still images of those scenes of animated images which have been selected in the step S408 are printed (step S410).

Figure 9:
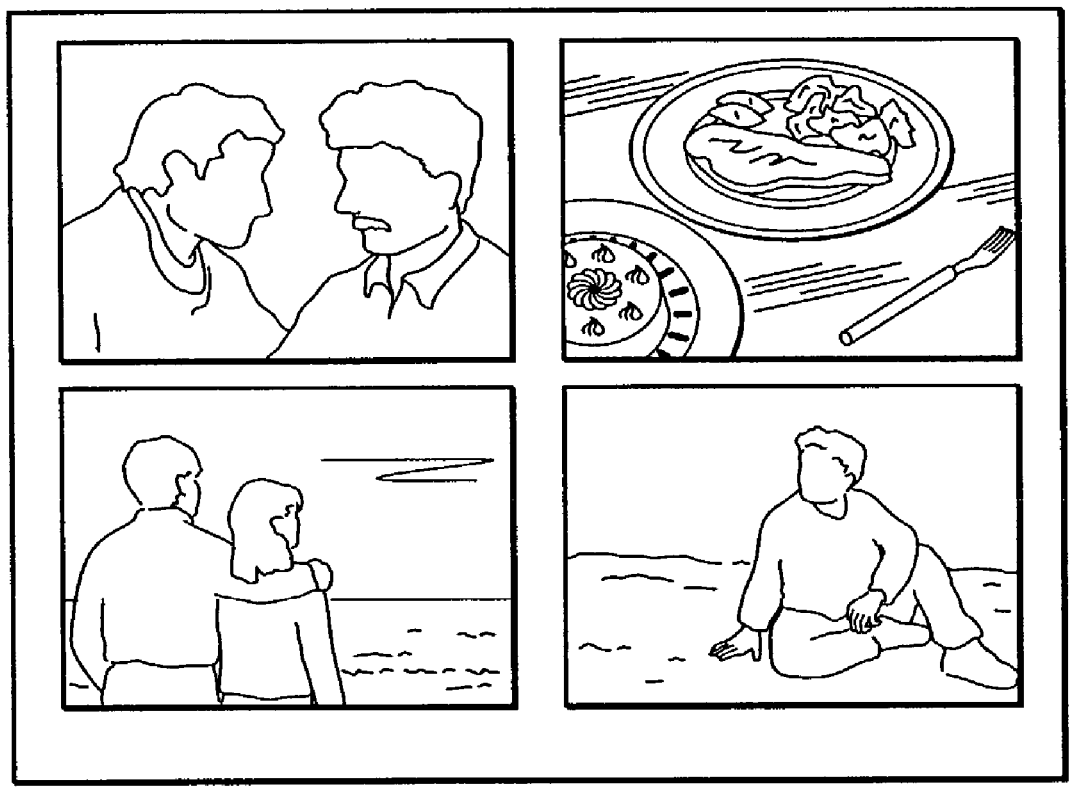
FIG. 9 is a view showing a print layout.

FIG. 9 is a view showing a print layout. For example, as shown in FIG. 9, four still images are arranged and printed on each of B5- or A5-sized sheets. The sheets can be output in the form of a simplified album by folding the sheets along the centerline thereof to bind them. The user can then enjoy viewing this album. Subsequently, the process returns to the step S402 to wait for a next command to be input. On the other hand, if the command input in the step S409 is not for printing, another required operation is performed (step S411), and the process returns to the step S402 to wait for a next command to be input.

Figure 10:
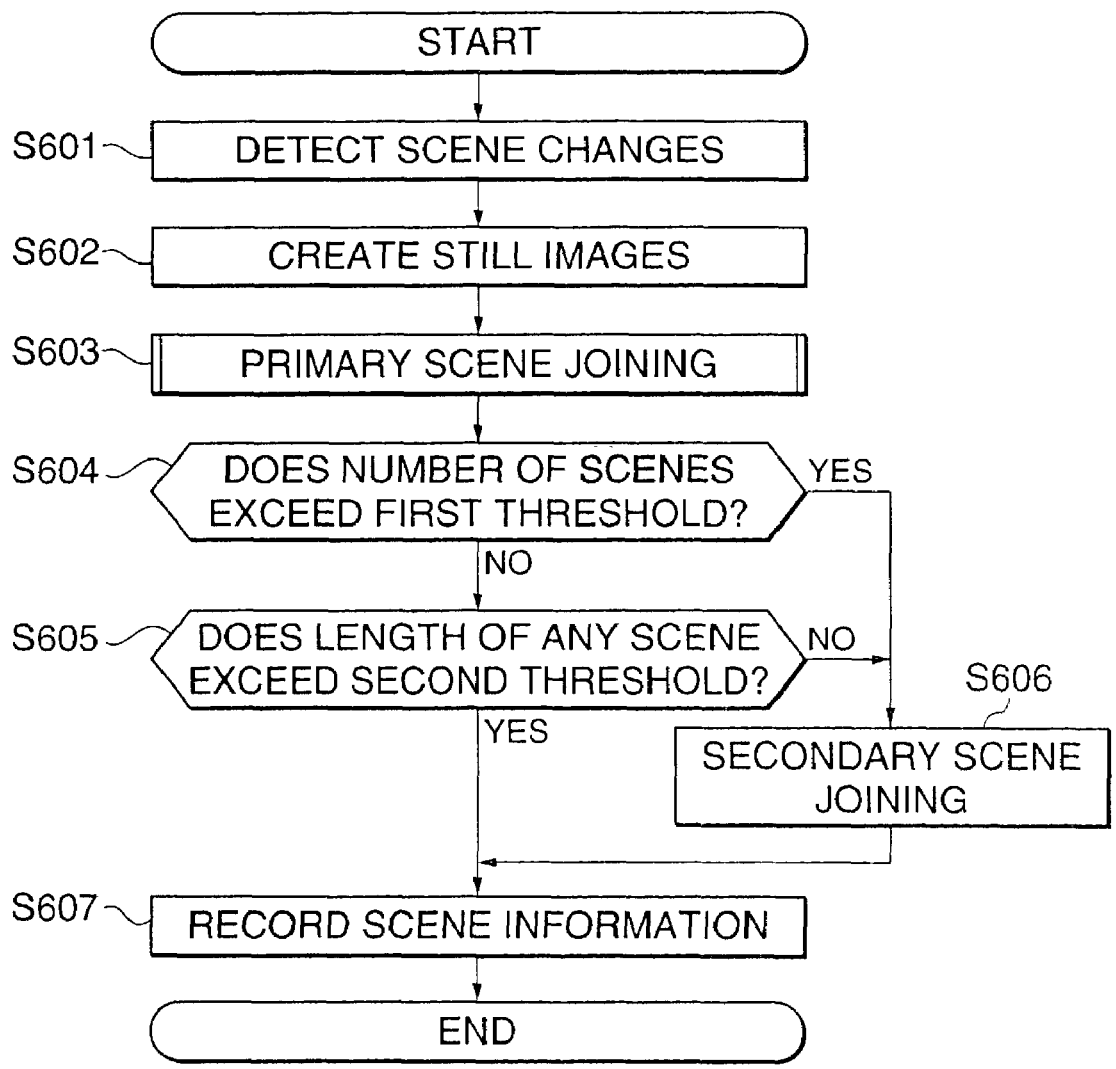
FIG. 10 is a flow chart showing an index creating process executed in the step S405.

FIG. 10 is a flow chart showing the index creating process executed in the step S405. First, breaks (division points) between the scenes are detected (step S601). In the present embodiment, to detect breaks between the scenes, the detection method based on changes between images is used as in the first embodiment.

Once breaks (division points) between the scenes are detected, still images are created (step S602). The method of creating still images may be similar to that described previously in the first embodiment.

Then, a primary scene joining process is executed (step S603). In the primary joining process, the degree of similarity between the still images of the scenes created in the step S602 is determined in a manner similar to that used to calculate the interframe similarity (distance), to reduce the number of scenes of similar images. This process will be described later in detail. Then, the still images that have been created from the joined scenes are deleted.

It is determined whether or not the number of scenes exceeds a preset first threshold (step S604). If the number of scenes is smaller than the first threshold, then it is determined whether or not the length of each scene exceeds a preset second threshold (step S605). In this case, if there is an excessively short scene, then although the number of scenes is smaller than the predetermined value, this scene is joined to the adjacent scene to reduce the number of indices.

If the number of scenes exceeds the first threshold in the step S604 or the length of any scene is smaller than the second threshold, then a secondary scene joining process is executed (step S606). In the secondary scene joining process, the number of scenes is reduced by joining scenes to each other so that the length of each scene exceeds the second threshold and the standard deviation (variation) of the lengths of the scenes is minimized. This process is not executed in an exceptional case where there is only one scene or the length of the entire animated image is smaller than the second threshold. This scene joining process may be similar to that used in the first embodiment.

After the secondary scene joining process in the step S606 is executed, the scene information and still images are associated with the moving images. Then, the obtained correspondences are recorded in the hard disk drive as indices (step S607), and the process is terminated.

Figure 11:
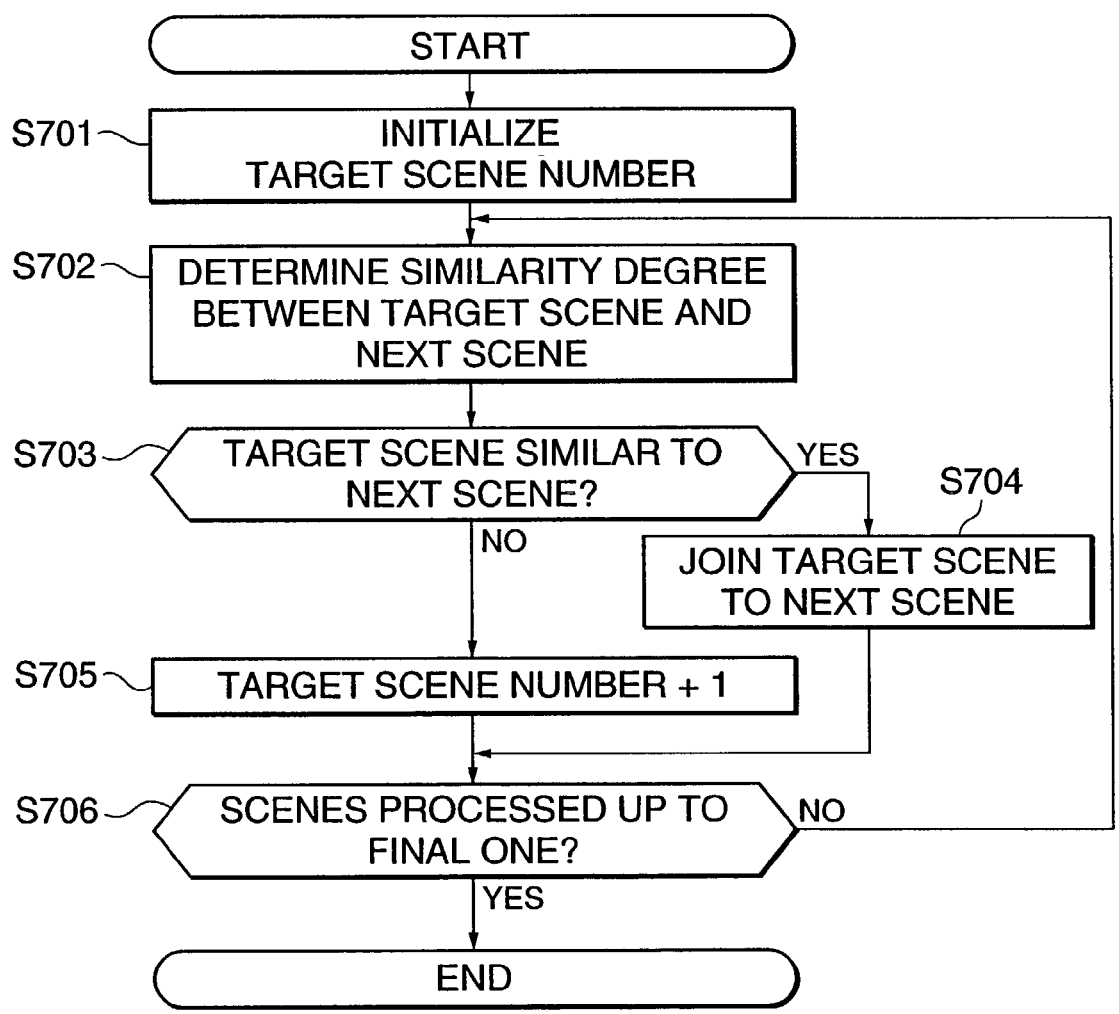
FIG. 11 is a flow chart showing a primary scene joining process executed in a step S603 in FIG. 10.

FIG. 11 is a flow chart showing the primary scene joining process executed in the step S603 in FIG. 10. The flow chart in FIG. 11 shows the case in which if the scenes of similar still images are contiguous with each other, these scenes are joined together. By the process up to the preceding step S602, the division points have already been determined, and still images have already been created, which correspond to the scenes separated from each other by the division points. The process shown in FIG. 11 is carried out based on a list of these scenes.

First, a target scene number is initialized (step S701) to target a first scene. The degree of similarity between the still images of the target scene and the next scene is determined using a method similar to that used to calculate the interframe similarity (distance) as described previously (step S702).

It is determined whether or not the determined degree of similarity exceeds a predetermined threshold (step S703). If it is determined that the degree of similarity exceeds the predetermined threshold, then the target scene and the next scene are joined together to obtain one scene (step S704). The process then proceeds to a step S706. On the other hand, it is not determined that the degree of similarity exceeds the predetermined threshold, the target scene number is incremented by one (step S705).

Then, it is determined whether or not the scenes have been processed up to the final one (step S706). In this case, if there is no scene following the target scene, then it is judged that the scenes have been processed up to the final one. If the scenes have been processed up to the final one, the primary joining process is terminated. On the other hand, if there remains any scene to be processed, the process returns to the step S702.

As described above, according to the second embodiment, only the still images representing the corresponding scenes, which are not similar to each other, are displayed on the display device 107. Therefore, the user can easily find the desired scene to enjoy reproducing the corresponding animated image.

Now, a third embodiment of the present invention will be described. A moving image recording and reproducing apparatus according to the third embodiment also has the same construction as the first embodiment, and description thereof is thus omitted. Here, only the process operation performed in the step S603 will be described, which is different from that in the second embodiment.

That is, for the primary scene joining process executed in the step S603 in the second embodiment, in the third embodiment, if any scenes have similar still images, the operator can determine whether or not to employ these scenes, while checking the still images.

Figure 12:
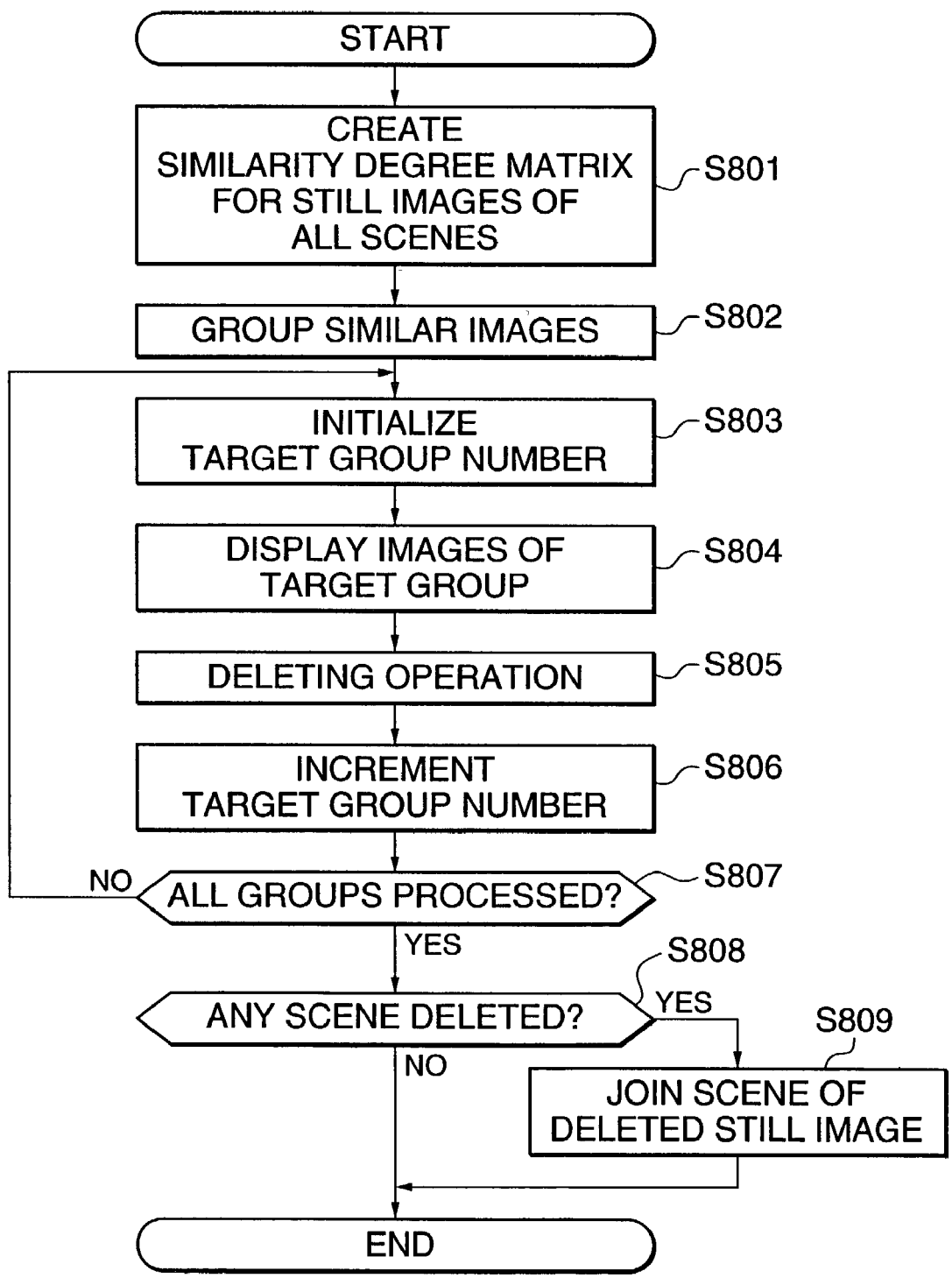
FIG. 12 a flow chart showing the primary scene joining process executed in the step S603 by a moving image recording and reproducing apparatus to which are applied a moving image recording apparatus and a moving image reproducing apparatus according to a third embodiment of the present invention.

FIG. 12 is a flow chart showing the primary scene joining process executed in the step S603 according to the third embodiment. The degrees of similarity between the still images of all scenes are determined to create a similarity degree matrix (step S801). The degree of similarity between still images can be determined in the same manner as that used in the second embodiment.

Images of which the degree of similarity exceeds a predetermined threshold are grouped, and such groups are listed (step S802). A target group number is initialized to target the leading item in the group list (step S803). The images of the target group are displayed (step S804). An operation is performed to remove unwanted still images from the displayed list (step S805).

Figure 13:
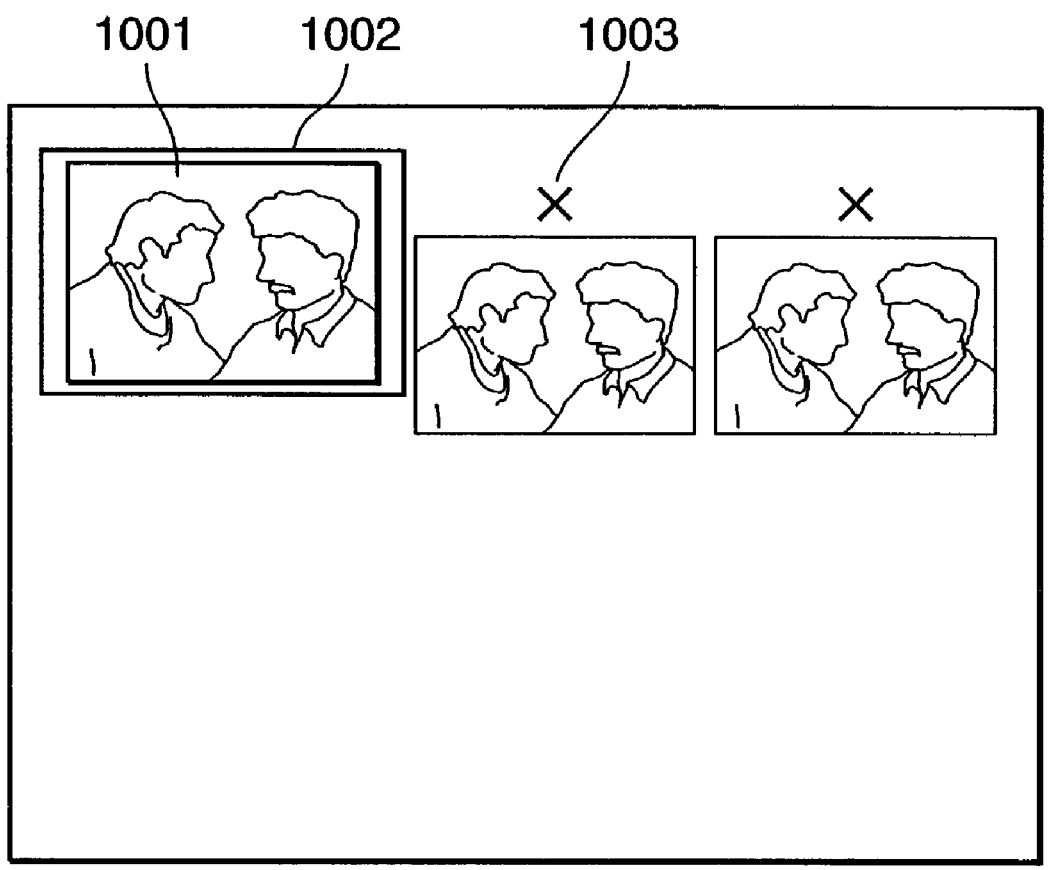
FIG. 13 is a view showing a screen displayed on the display device 107 when still images are deleted.

FIG. 13 is a view showing a screen displayed on the display device 107 when still images are deleted. On the screen is displayed a list of similar images included in the target group. In the figure, reference numeral 1001 designates a still image of a scene. Reference numeral 1002 designates a cursor indicating the current target point. Reference numeral 1003 denotes a mark indicating that the related still image has been designated to be deleted.

The right or left arrow button 306 or 307 of the remote controller 112 can be selectively depressed to move the cursor. Even if not all images are displayed on the screen, the cursor can be moved to any target animated images by scrolling or switching the screen. If deletion is to be designated, the up and down arrow buttons 305 and 308 are used to turn on or off a deletion mark for an image with the cursor placed thereon. Then, the OK button 309 is depressed to make the deletion mark effective, thus completing this process. Otherwise, the CANCEL button 310 is depressed to make the deletion mark ineffective, thus completing this process.

Then, the target group number is incremented by one (step S806). It is then determined whether or not the target group number exceeds the number of all the groups (step S807). If the number of all the groups is not exceeded, the process returns to the step S803. On the other hand, if the number of all the groups is exceeded, it is determined whether or not there is any scene the still image of which has been deleted (step S808).

If any scene has had its still image deleted, this scene is joined to the preceding scene (step S809), followed by terminating the primary joining process. On the other hand, if no scene has had its still image deleted, the process is immediately terminated.

As described above, according to the third embodiment, the operator can directly determine whether or not to employ still images while checking them.

The embodiments of the present invention have been described. However, the present invention is not limited to these embodiments, but is applicable to any other construction which can achieve the functions set forth in the claims or the functions of the above described embodiments.

For example, in the above described embodiments, breaks between scenes are detected based on the interframe similarity (distance). However, other methods may be used for the detection. For example, breaks between scenes may be detected based on discontinuities between time codes. A digital video camera records shooting times as time codes together with animated images. Accordingly, it is easy to detect discontinuities between time codes as breaks between scenes.

Alternatively, breaks between scenes may be detected using attribute information. With the detection method using attribute information, breaks between scenes is detected using not only time codes but also meta information such as the start and end of a zoom, pan, or tilt which information is automatically output by analyzing the video camera or frame images or manually added meta information on a logical structure or the subjects of the moving image. In this case, scene information is used, which is comprised of a scene start frame as well as the type of attribute information used for detecting scenes.

Furthermore, scenes may be detected by properly selecting or combining the detection method based on the inter-frame similarity (distance), the detection method based on discontinuities between time codes, and the detection method based on attribute information.

Further, in the above described embodiments, animated image data is input via the video I/F 115. However, animated image data may be input via any of the network I/F 110, CD/DVD drive 106, and memory card I/F 105. Furthermore, in the flow charts shown in FIGS. 4 and 7, an index is created in the step S405 after animated images have been completely recorded in the step S404. However, a multitask system may be introduced such that an index can be created while animated images are being recorded.

Moreover, in the above described embodiments, a still image is created for each scene, and the scene information and still images are recorded in association with the corresponding animated images to obtain an index. However, if particular frame images are used as still images, the corresponding frame numbers alone may be recorded in place of still image data. In this case, the still image creating means may be configured such that when a still image is required for display or the like on demand, still image data is created based on the corresponding frame number and the animated image data.

Further, in the above described embodiments, after it has been determined in the step S502 whether or not the number of scenes exceeds the first threshold, it is determined in the step S502 whether or not the length of each scene exceeds the second threshold. Then, if the length of any scene does not exceed the second threshold, the scene joining process is executed. However, the order of the determinations may be changed. For example, if the length of any scene does not exceed the second threshold, the scene joining process may be executed, followed by determination as to whether or not the number of scenes resulting from the joining process exceeds the first threshold. Then, if the number exceeds the first threshold, the scene joining process may be executed again. This prevents the number of scenes from being unnecessarily reduced.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium.

In this case, the program code itself read from the storage medium realizes the functions of the embodiment described above, and hence the storage medium on which the program code is stored constitutes the present invention.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM.

Further, it is to be understood that the functions of the above described embodiment may be accomplished not only by executing a program code read out by a computer, but also by causing an OS (Operating System) or the like which operates on the computer to perform a part or all of the actual operations based on instructions of the program code.

Further, it is to be understood that the functions of the above described embodiment may be accomplished by writing a program code read out from the storage medium into an expansion board inserted into a computer or a memory provided in an expansion unit connected to the computer and then causing a CPU or the like provided in the expansion board or the expansion unit to perform a part or all of the actual operations based on instructions of the program code.

In the above described embodiments, the programs shown in the flow charts of FIGS. 4, 5, 10, 11, and 12 are stored in the ROM 102 as a storage medium. However, the programs may be supplied by any of the PC card read and write interface 105, CD/DVD drive 106, network interface 110, and the serial interface 113. In this case, the CPU 101 temporarily stores the supplied programs in the hard disk drive 104 or RAM 103 before execution.

What is claimed is:

1. A moving image recording apparatus comprising:
   recording means for recording a moving image together with attribute information therefor;
   division point detecting means for detecting division points at which the moving image breaks on a time base and dividing the moving image at the detected division points into scenes;
   still image creating means for creating still images from respective ones of the scenes into which the moving image is divided at the detected division points;
   similarity degree calculating means for calculating degrees of similarity between the created still images;
   scene joining means for joining the scenes into which the moving image is divided, based on the calculated degrees of similarity; and
   deleting means for deleting the created still images from the joined scenes.

2. A moving image recording apparatus as claimed in claim 1, wherein said similarity degree calculating means calculates the degrees of similarity based on amounts of changes between the created still images.

3. A moving image recording apparatus as claimed in claim 1 or 2, further comprising deleting object selecting means for grouping the created still images based on the calculated degrees of similarity and selecting from the grouped created still images still images which are designated as objects to be deleted by a user, and
   wherein said scene joining means joins each of scenes corresponding to the still images selected as objects to be deleted, to at least one other scene.

4. A moving image recording method comprising the steps of:
   recording a moving image together with attribute information therefor;
   detecting division points at which the moving image breaks on a time base and dividing the moving image at the detected division points into scenes;
   creating still images from respective ones of the scenes into which the moving image is divided at the detected division points;
   calculating degrees of similarity between the created still images;
   joining the scenes into which the moving image is divided, based on the calculated degrees of similarity; and
   deleting the created still images from the joined scenes.

5. A moving image recording and reproducing method comprising the steps of:
   recording a moving image together with attribute information therefor;

detecting division points at which the moving image breaks on a time base and dividing the moving image at the detected division points into scenes;

creating still images from respective ones of the scenes into which the moving image is divided at the detected division points;

calculating degrees of similarity between the created still images;

joining the scenes into which the moving image is divided, based on the calculated degrees of similarity;

deleting the created still images from the joined scenes;

displaying the created still images;

selecting any of the displayed still images; and reproducing means for reproducing scenes of the moving image corresponding to the selected still images.

6. A moving image reproducing apparatus which is applicable to a moving image recording apparatus as claimed in claim 1 and which reproduces an animated image stored in a storage medium, comprising:

display means for displaying still images recorded in the storage medium;

still image selecting means for selecting any of the displayed still images; and reproducing means for reproducing scenes of the moving image corresponding to the selected still images.

7. A moving image reproducing apparatus as claimed in claim 6, further comprising print means for printing the selected still images.

8. A computer-readable storage medium storing a program code for realizing a moving image recording method as claimed in claim 4 or a moving image recording and reproducing method as claimed in claim 5.

* * * * *